No. 663,837. Patented Dec. 11, 1900.
A. C. SWAIN.
GAS PURIFIER.
(Application filed Apr. 20, 1900.)
(No Model.)
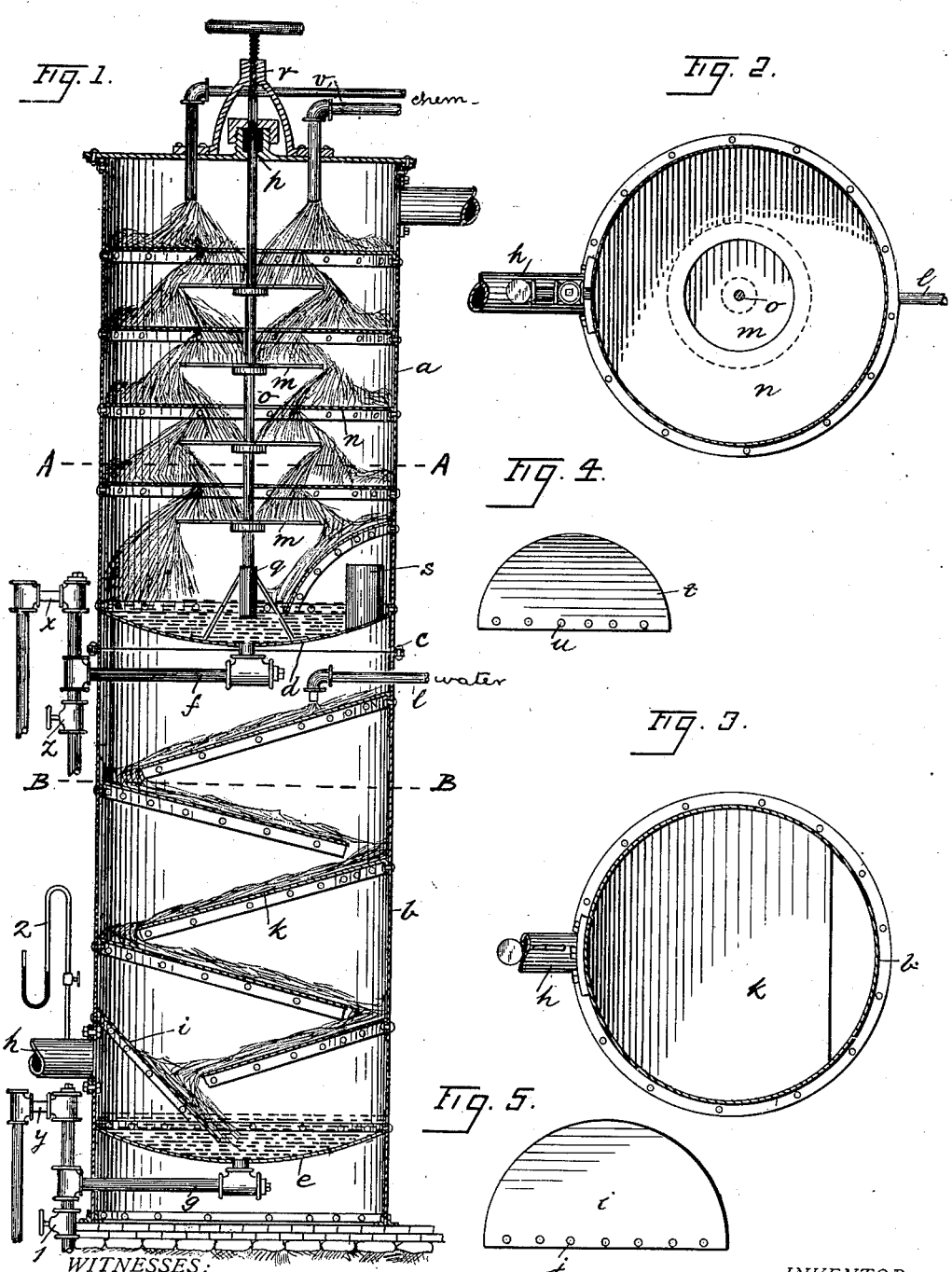
INVENTOR.
Appius C. Swain
BY Francis M. Wright,
ATTORNEY.

United States Patent Office.

APPIUS C. SWAIN, OF SAN FRANCISCO, CALIFORNIA, ASSIGNOR OF ONE-HALF TO JAY MILTON BOWERS, OF SAME PLACE.

GAS-PURIFIER.

SPECIFICATION forming part of Letters Patent No. 663,837, dated December 11, 1900.

Application filed April 20, 1900. Serial No. 13,653. (No model.)

*To all whom it may concern:*

Be it known that I, APPIUS C. SWAIN, a citizen of the United States, residing at San Francisco, in the county of San Francisco and State of California, have invented certain new and useful Improvements in a Combined Washer, Scrubber, and Purifier for Illuminating-Gas, of which the following is a specification.

My invention relates to an improved combined washer, scrubber, and purifier for illuminating-gas, the object of my invention being to provide a single apparatus compact in form and cheap and simple in construction which will effectually clean and purify the gas at very small expense for operating—one, moreover, by means of which a higher percentage of the valuable constituents of the gas can be saved and a higher candle-power obtained than with apparatus of this character heretofore in use.

My invention therefore resides in the novel construction, combination, and arrangement of parts for the above ends hereinafter fully specified, and particularly pointed out in the claims.

In the accompanying drawings, Figure 1 is a vertical section of the apparatus. Fig. 2 is a horizontal section on the line A A of Fig. 1. Fig. 3 is a horizontal section on the line B B of Fig. 1. Fig. 4 is a rear view of the deflecting-plate for the purifier removed, and Fig. 5 is a similar view of the deflecting-plate for the scrubber.

Referring to the drawings, it will be seen that my improved apparatus consists of a tower of either circular or square cross-section (I have herein shown the tower as cylindrical) made in a single shell. For convenience of assemblage, however, the tower is made in two sections—an upper section $a$ and a lower section $b$—riveted together, as shown at $c$. The lower section $b$ constitutes the washer and scrubber, and the upper section $a$ constitutes the washer and purifier, of the illuminating-gas. Said sections are made with concave or basin-like bottoms or washers $d$ $e$, which prevent the clogging up of the scrubber and purifier. To said bottoms are tapped the overflow or waste pipes $f$ $g$ to carry off the tar and foul matter washed out of the gas. The gas entering the scrubber by the inlet-pipe $h$ from the gas generator and fixer flows against the deflecting-plate $i$, which is set at an angle over said inlet-pipe and has its lower edge below the normal level of the water in the basin-like washer $e$ of the scrubber, thus compelling the gas to pass under and through the water before passing up through the scrubber. Said plate has formed therein near the lower edge a number of small perforations $j$, through which the gas passes, being thereby broken up and thoroughly washed in passing through the water in the bottom of the scrubber. By means of this construction the gas drops most of its tarry matter in the washer and saves the scrubber from handling the heavy tars.

Above the washer $e$ extends the scrubber, provided with zigzag shelving to the top. The shelves $k$ are set on a slant in such a manner as to permit a free flow to the passage of the gas and prevent clogging. The water enters the top of the scrubber through the pipe $l$ and flows down said shelves and meeting the ascending gas is gradually heated on its descent. Thus the gas entering at or near the bottom of the washer must first pass through hot water, thereby saving much more of its lighter carbons than if washed through cold water. As the water passes upward through the scrubber it meets at every shelf a different temperature of water, and when it reaches the outlet the gas passes into the purifier at a reduced temperature, thus keeping the chemicals inside the purifier at a desired low temperature. In this way the gas is made to pass the opposite way and through the water at every turn in the shelving, and thus the gas is exposed to a very large scrubbing and cooling surface.

The upper section of the apparatus, consisting of the washer and chemical purifier, is furnished with a series of alternating disks $m$ and baffle-plates $n$. The baffle-plates $n$ are secured to the shell of the purifier, and the disks $m$ are made fast to a central rod $o$, which is guided in upper and lower bearings $p$ $q$ and is adjustably supported at the top, as shown at $r$, so that the openings between the disks and baffle-plates may be varied to furnish any back pressure necessary to produce the best results. I have here shown the adjustment as made by means of a screw, and a gas-tight stuffing-box is provided for the rod, which passes through the top of the purifier.

The gas passes out of the scrubber by means of a pipe $s$, through which it emerges, impinging upon a deflecting-plate $t$, bent downward, as shown, the lower edge of said deflecting-plate passing below the surface of the liquid in the washer at the bottom of the purifier, said plate being perforated at said lower edge, as shown at $u$, whereby the gas in passing up through the water is minutely divided and becomes thoroughly mingled with the chemicals and water. In this way the tar, ammonia, and other impurities are eliminated from the gas.

$v$ represents inlet-pipes for suitable chemicals, which are passed through said pipes into the top of the purifier and then flow down through the purifier alternately onto the baffle-plates and disks to the washer $d$ in the bottom of the purifier, whence they are drawn by means of an overflow-pipe $f$, from which, if desired, they may be carried back to the tank by means of a pump to be used over and over again until the mixture becomes foul with sulfur compounds, when it is again replenished with a fresh chemical mixture.

$x$ $y$ are siphon-seals which can be set to any desired height to overcome the back pressure from the gas-holder or gas-works.

$z'$ represents draw-off valves for drawing off all liquors and water from the purifier and scrubber.

$z^2$ is a U-shaped pressure-gage for indicating the pressure in the gas-inlet to the scrubber.

An important advantage obtained by my construction is that the gas is washed first in water that has been highly heated by contact with the ascending gas, and thus a much larger percentage of the lighter hydrocarbons is saved than with the practice which has heretofore prevailed of washing the gas first in cold water.

The cooling of the gas takes place gradually as it ascends through the scrubber, and thus the greatest possible saving is effected in the purification of the gas and a higher candle-power obtained than would otherwise be the case.

I claim—

1. In an apparatus of the character described, the combination of a casing, a water-pipe entering the top of the casing, zigzag shelving down which water flows in a tortuous path from the pipe to the bottom of the casing, a concave bottom for said casing, a gas-pipe discharging into said casing near said bottom, a deflecting-plate over the mouth of the gas-pipe, to deflect the gas into the water in said concave bottom, said deflecting-plate being perforated near its lower edge, an outlet for the gas at the top of the casing, and an outlet for the water at the bottom of the casing, substantially as described.

2. In an apparatus of the character described, the combination of a casing having a concave bottom, annular baffle-plates secured to the casing, disks alternating with said baffle-plates, a central rod supporting said disks, a gas-inlet near the bottom of the casing, a deflecting-plate over said gas-inlet having its lower edge perforated, a gas-outlet at the top of the casing, a liquid-inlet at the top of the casing and a liquid-outlet at the bottom of the casing having a siphon-seal, substantially as described.

3. In an apparatus of the character described, the combination of a casing having a concave bottom, annular baffle-plates secured to the casing, disks alternating with said baffle-plates, a central rod supporting said disks, means for adjusting said rod vertically to adjust the openings between the disks and baffle-plates, a gas-inlet near the bottom of the casing, a deflecting-plate over said gas-inlet having its lower edge perforated, a gas-outlet at the top of the casing, a liquid-inlet at the top of the casing and a liquid-outlet at the bottom of the casing having a siphon-seal, substantially as described.

4. In an apparatus of the character described, the combination of a scrubber and purifier, having a common casing, the latter arranged above the former, each having a concave or basin-like bottom, a liquid-outflow pipe leading therefrom and a liquid-inlet pipe at the top, and each having shelving arranged to form a tortuous path for the descending liquid the scrubber having a gas-inlet pipe at its lower end and a gas-outlet from its upper end leading to the lower end of the purifier, and the purifier having a gas-outlet pipe at its upper end, substantially as described.

5. In an apparatus of the character described, the combination of a scrubber and purifier, having a common casing, the latter arranged above the former, each having a concave or basin-like bottom, and a liquid-outflow pipe leading therefrom and a liquid-inlet pipe at the top, and each having shelving arranged to form a tortuous path for the descending liquid, the scrubber having a gas-inlet pipe at its lower end and a gas-outlet from its upper end leading to the lower end of the purifier and the purifier having a gas-outlet pipe at its upper end, and said scrubber and purifier having each a deflecting-plate over the gas-inlet pipe thereinto, substantially as described.

6. In an apparatus of the character described the combination of a scrubber and purifier having a common casing, the latter arranged above the former, each having a concave or basin-like bottom, and a liquid-outflow pipe leading therefrom and a liquid-inlet pipe at the top, and each having shelving arranged to form a tortuous path for the descending liquid, the scrubber having a gas-inlet pipe at its lower end and a gas-outlet from its upper end leading to the lower end of the purifier, and the purifier having a gas-outlet pipe at its upper end and said scrubber and purifier having each a deflecting-plate over the gas-inlet pipe thereinto, said plate being perforated at its lower edge, substantially as described.

In witness whereof I have hereunto set my hand in the presence of two subscribing witnesses.

A. C. SWAIN.

Witnesses:
FRANCIS M. WRIGHT,
MRS. E. M. COOK.